May 10, 1938.    W. H. FRANK ET AL    2,116,676
ELECTRICAL DISTRIBUTION SYSTEM
Filed Dec. 4, 1936    2 Sheets-Sheet 1

INVENTOR.
William H. Frank &
Lawrence E. Fisher
BY
Daniel G. Cullen ATTORNEY.

May 10, 1938. W. H. FRANK ET AL 2,116,676
ELECTRICAL DISTRIBUTION SYSTEM
Filed Dec. 4, 1936    2 Sheets-Sheet 2

INVENTOR.
William H. Frank &
Laurence E. Fisher
BY Daniel G. Cullen
ATTORNEY.

Patented May 10, 1938

2,116,676

UNITED STATES PATENT OFFICE 2,116,676

ELECTRICAL DISTRIBUTION SYSTEM

William H. Frank and Lawrence E. Fisher, Detroit, Mich.

Application December 4, 1936, Serial No. 114,261

4 Claims. (Cl. 247—3)

This application relates to electrical distribution systems of the bus duct type, comprising duct or casing in which are disposed and suitably supported electrical conductors such as bus bars.

In a prior patent, No. 2,041,675 of May 19, 1936, there is disclosed a bus duct distribution system similar to the one hereof and similarly provided with openings in the duct through which may be inserted prongs of branch circuit take-off devices for engaging the bus bars and establishing connections between them and the terminals of the branch circuit take-off devices. In that patent there is shown as an arrangement for supporting the bus bars within the duct in an insulated manner, transverse plates 26 of insulation which are so proportioned as to divide the duct into cells, and a substantially close fit was provided between the bus bars and the slots of the plates through which these passed, and a similar close fit was provided to insure the cells being sealed from one another to a substantial degree.

Now, it has been discovered that in the use of the duct illustrated in Patent No. 2,041,675 there occurred some few instances of burning of duct due to arcs formed incident to electrical surges, leakage, loose connections, insulation break-downs, and other causes and it was further discovered that this burning of duct was due to the fact that the barriers 26 operated to prevent the free travel of arcs along the bus bars and that the thus confined arcs burned the duct or casing at points near where the arcs were formed. After considerable study, it was discovered that burning of duct due to arcs could be eliminated and prevented by so designing the bus bar supports that they permitted the arcs formed to run the full length of the duct freely and quickly and without interference to a point where they could be dissipated safely, reliance being placed upon magnetic force created by the current in the bus bars to cause the arc to travel quickly along the duct to the dissipating center.

It was discovered that as long as the arc was permitted to travel freely and rapidly along the bus bars, no damage to the duct would occur, provided a suitable dissipating center was provided for the arcs which course the duct. However, as stated above, when an obstruction to the coursing of the arc existed, sufficient to stop the arc, the arc burned the duct and in some instances the bus bars as well.

For example, the insulators shown at 26 of Patent No. 2,041,675 provide such obstructions and consequently cause arcs to stop at the insulators, resulting in burning at such insulators, and in some cases causing arcs to be formed in neighboring cells due to the fact that gases arising on arcing in a cell would flow past the support into the next cell and create new arcs in such other cell.

In this application there is disclosed bus supporting means designed to permit free coursing of arcs along the duct. Further, there is here shown a dissipating center for arcs coursing in duct.

In this application there is also shown a bus supporting arrangement so designed as not to minify the conductive or exposed surface area of the bus bars, which is of importance in considering factors like expansion and contraction of bus bars, heat dissipation by bus bars, etc.

In this application there is also shown a bus supporting construction which functions to help in extinguishing arcs that might arise in the duct.

For an understanding of the supporting means here shown, and the dissipating center here shown, reference should be had to the appended drawings. In these drawings, Fig. 1 shows a duct in cross section provided with an arrangement for supporting bus bars;

Figs. 2 and 2a are sections on lines 2—2 and 2a—2a, Figs. 1 and 2.

Figure 1:
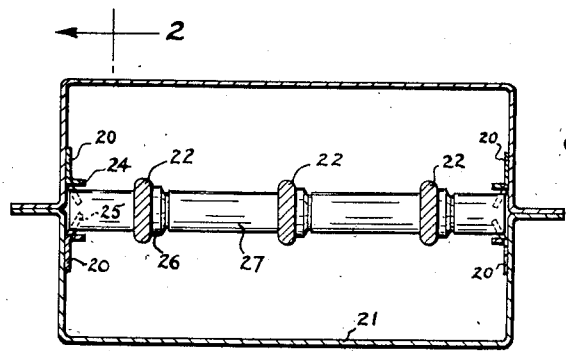
Figure 2A:
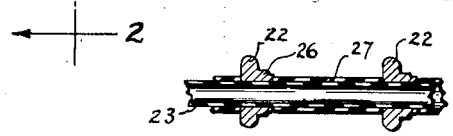
Figure 2:
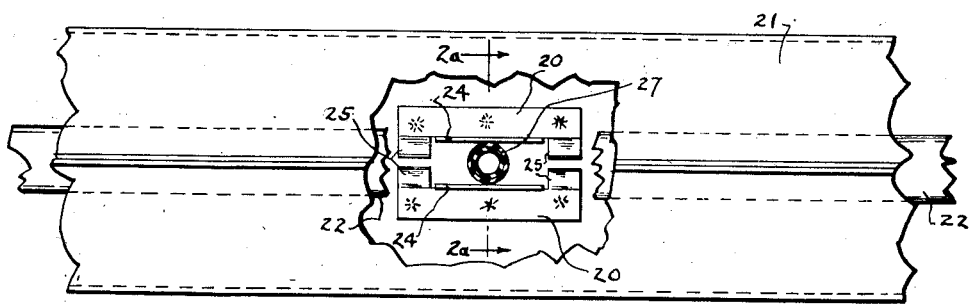

In the arrangement of Figs. 1-2a, metal plates 20 are shown as welded to the duct 21 at longitudinally spaced intervals not too close to the openings, not shown, through which prongs may be inserted into the duct for engagement with the bus bars 22 which are apertured to permit an insulation tube 23 to be passed therethrough and have its ends received between the outwardly bent lugs 24 of the metal plates 20 whereby the tubes will be supported from the duct and will be prevented from shifting up and down in the duct, it being observed that longitudinal shifting of the tubes and the bus bars, to compensate for misalignment, manufacturing tolerance, and expansion due to temperature rises is permitted to some extent, with the parts restrained against excessive shifting by lugs 23 bent outwardly from the metal plates 20. The edges of the holes of the bus bars through which pass the tubes 23 are extruded or flanged as shown at 26 to provide the bus bars with their original or full cross sections for current carrying purposes and to form suitable bearings for the bus bars and tubes, and between the bus bars and telescoped around the tubes 23 there are spacer tubes 27 arranged as shown.

The arrangement here shown has been found satisfactory for supporting bus bars in duct and has also been found to permit free coursing of arcs in duct.

Figure 3:
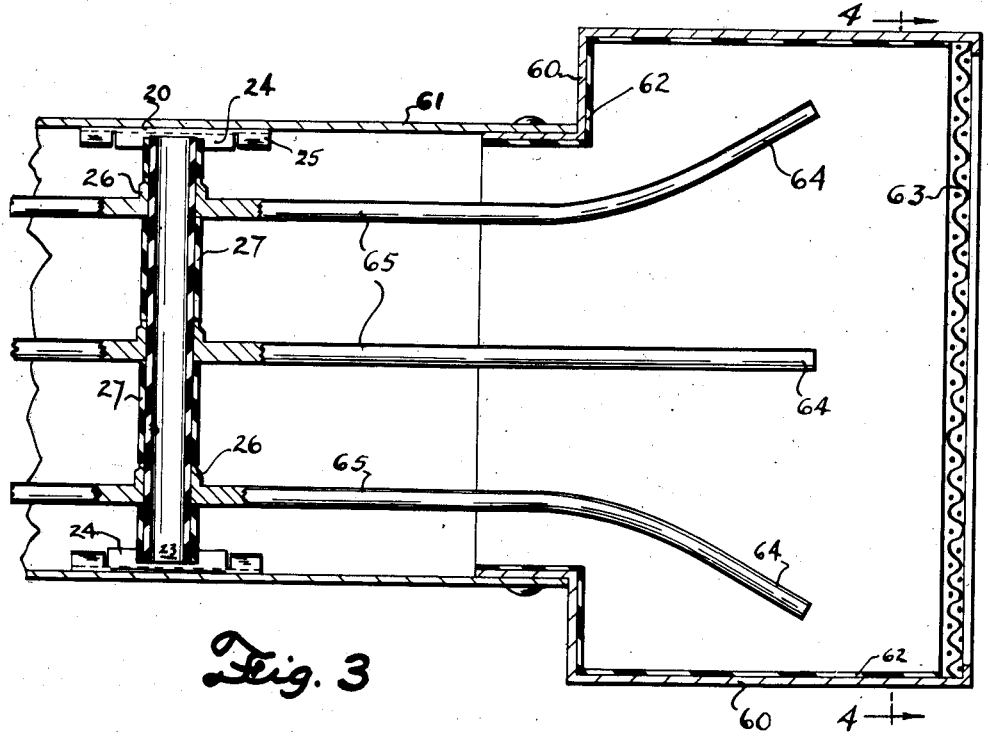
Fig. 3 shows a dissipating center for bus duct.
Figure 4:
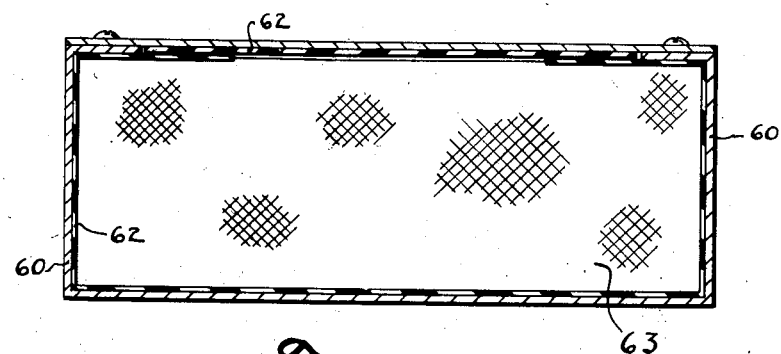
Fig. 4 is a section on line 4—4 of Fig. 3.

Fig. 3 shows a dissipating center which comprises a sheet metal cap 60 formed to cap the open end of a duct run 61 and lined with insulation 62 and having its end wall, closing the duct, of foraminous material such as the screen 63 indicated. Arcs coursing along the duct reach the flared terminals 64 of the bus bars 65 and are there dissipated within the cap, and venting of the gases due to dissipating of such arcs is provided through the screen, which acts as a flame arrester and prevents the arcs from shooting flames out of the duct, while at the same time extinguishing such flames.

To enhance the dissipating characteristics of the dissipating center the cap might be stuffed with finely divided insulation such as rock wool, glass wool, etc.

Other arrangements differing in detail from those here shown might well be designed and these are considered within the purview of this application, the scope of whose protection is indicated by the appended claims.

We claim:

1. In combination, sheet metal bus duct, bus bars therein, means for insulatedly supporting the bus bars, said means being so constructed and arranged as not to prevent arcs within the duct from coursing freely therethrough along the bus bars, and means formed as part of the duct and providing an arc dissipating center therein.

2. In combination, sheet metal bus duct, bus bars therein, and means for insulatedly supporting the bus bars, said means being so constructed and arranged as not to prevent arcs within the duct from coursing freely therethrough along the bus bars, and an arc dissipating center for the duct comprising a duct portion in which the bus bars terminate in flared portions, like horn gaps, the duct portion portion having a foraminous flame arresting and venting wall.

3. In combination, sheet metal bus duct, bus bars therein, and means for insulatedly supporting the bus bars, said means being so constructed and arranged as not to prevent arcs within the duct from coursing freely therethrough along the bus bars, and an arc dissipating center for the duct comprising a duct portion in which the bus bars terminate in flared portions, like horn gaps, the duct portion having a foraminous flame arresting and venting wall, the duct portion being filled with finely divided insulating material.

4. In combination, sheet metal bus duct, bus bars therein, means for insulatedly supporting the bus bars, said means being so constructed and arranged as not to prevent arcs within the duct from coursing freely therethrough along the bus bars, and means formed as part of the duct and providing an arc dissipating center therein, the arc dissipating center being so formed that arcs existing therein are dissipated without creating damage or injury to the duct or any parts therein or associated therewith.

WILLIAM H. FRANK.
LAWRENCE E. FISHER.